United States Patent
Nothum, Sr. et al.

(10) Patent No.: US 6,510,810 B2
(45) Date of Patent: Jan. 28, 2003

(54) CONVERTIBLE COMBINATION BATTER MIXER AND APPLICATOR MACHINE

(76) Inventors: Robert G. Nothum, Sr., 2719 S. Catalina, Springfield, MO (US) 65804; Robert G. Nothum, Jr., 6356 W. State Hwy. O, Willard, MO (US) 65781

( * ) Notice: Subject to any disclaimer, the term of this patent is extended or adjusted under 35 U.S.C. 154(b) by 60 days.

(21) Appl. No.: 09/765,088

(22) Filed: Jan. 17, 2001

(65) Prior Publication Data

US 2002/0020343 A1 Feb. 21, 2002

Related U.S. Application Data

(60) Provisional application No. 60/176,877, filed on Jan. 18, 2000.

(51) Int. Cl.$^7$ .................................................. B05C 3/02
(52) U.S. Cl. .............................. 118/26; 118/29; 118/30; 118/612
(58) Field of Search ......................... 118/16, 26, 29–31, 118/612; 426/496; 99/404, 494; 366/152.3, 152.5, 153.1, 136, 137

(56) References Cited

U.S. PATENT DOCUMENTS

| | | | |
|---|---|---|---|
| 3,885,519 A | * 5/1975 | Orlowski | 118/16 |
| 3,967,583 A | 7/1976 | Booth | 118/16 |
| 4,023,521 A | 5/1977 | Booth | 118/16 |
| 4,058,083 A | 11/1977 | Miller | 118/16 |
| 4,198,167 A | 4/1980 | Deal et al. | 366/152 |
| 4,505,593 A | 3/1985 | Miller et al. | 366/152 |
| 4,687,674 A | 8/1987 | Akesson | 426/549 |
| 5,865,890 A | 2/1999 | Makujina | 118/13 |
| 5,924,356 A | 7/1999 | Harper et al. | 99/494 |

\* cited by examiner

Primary Examiner—Laura Edwards
(74) Attorney, Agent, or Firm—Jonathan A. Bay

(57) ABSTRACT

A convertible, combination batter-mixer and -applicator machine combines mixing and applying functions in one machine as well as affords conversion among at least three modes of use. In a first mode, the batter is preferably handled by mixing up one batch at a time from materials whose input quantities are specified in terms of defined weight-ratios, and then the batch is used up completely until depleted. In a second mode, the batter is preferably handled by mixing up one batch at a time from materials whose input quantities are adjusted in order to meet a defined-viscosity, and then the batch is used up completely until depleted. The third mode involves re-circulating the batter stock and calls for continuous re-stocking of batter by mixing in the input materials at varying intervals to the existing stock and in input quantities that are adjusted in order to meet the defined-viscosity.

20 Claims, 6 Drawing Sheets

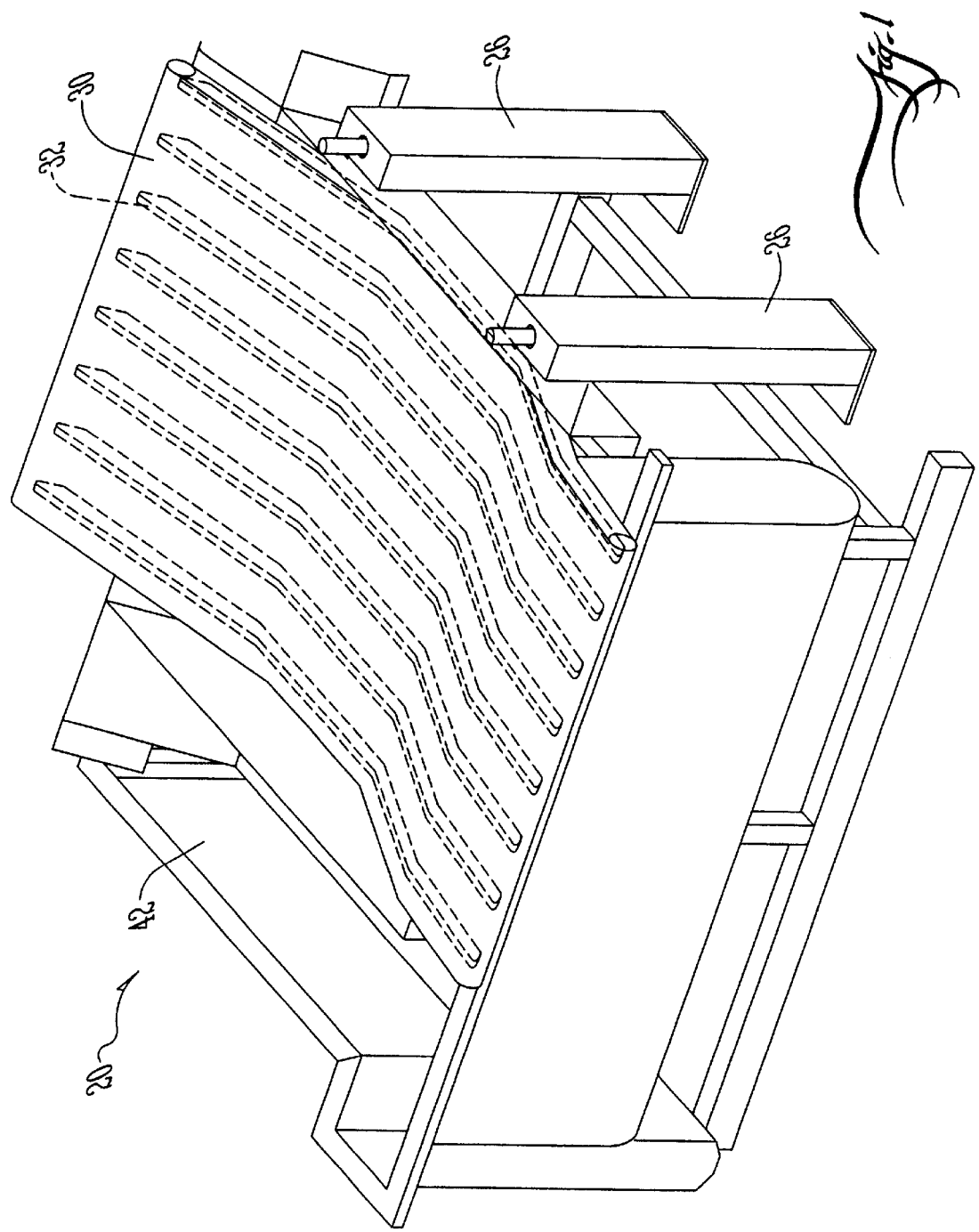

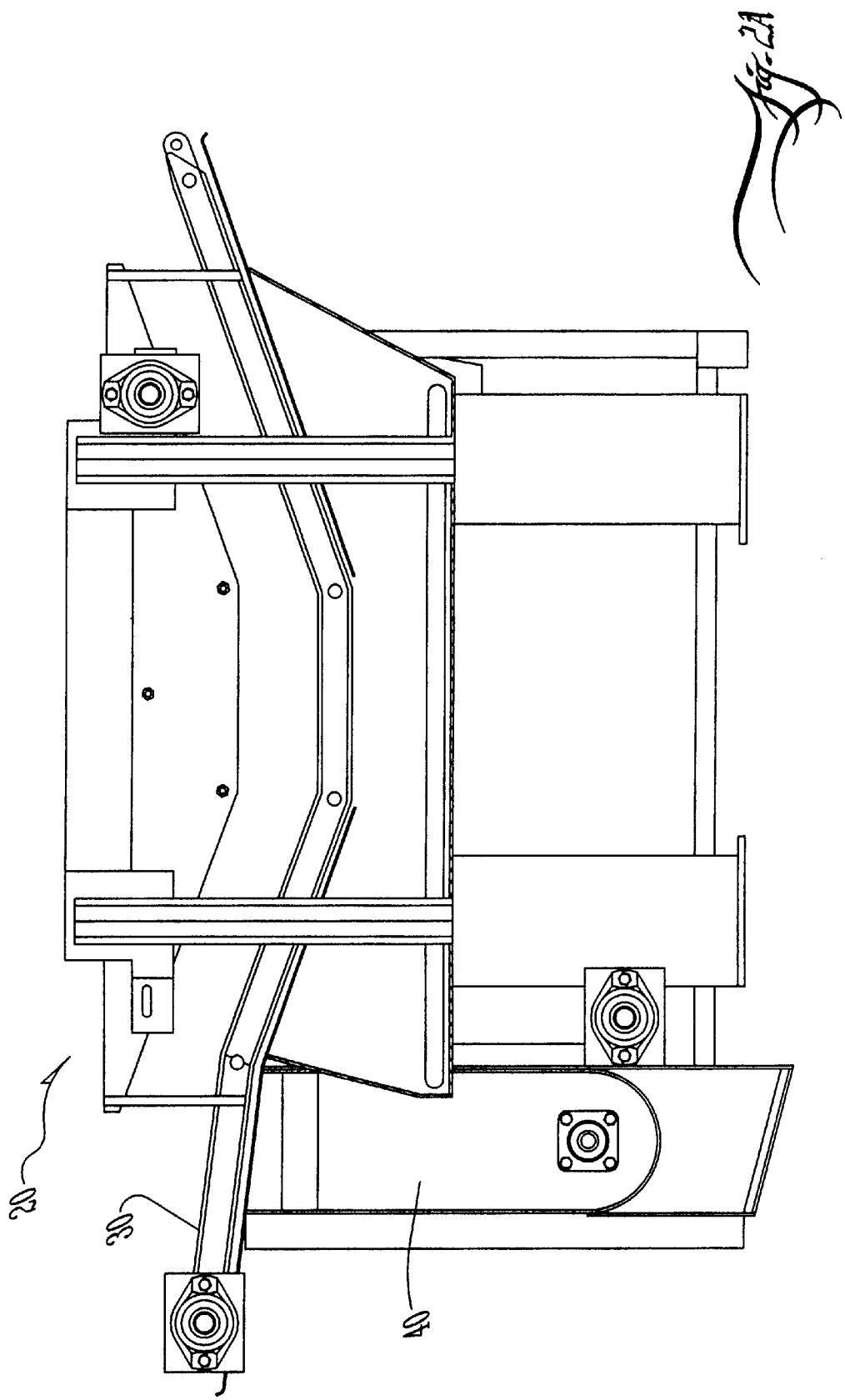

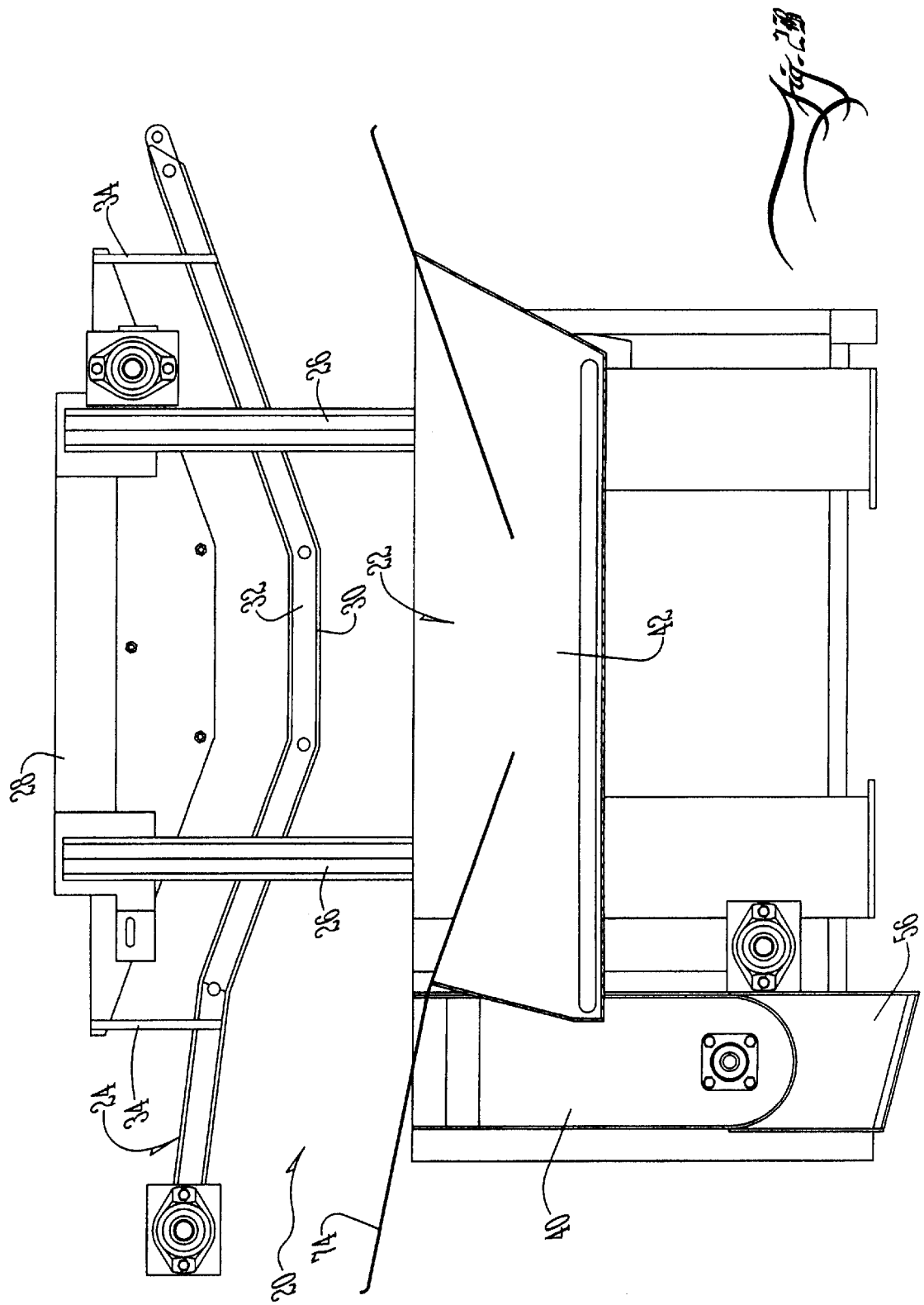

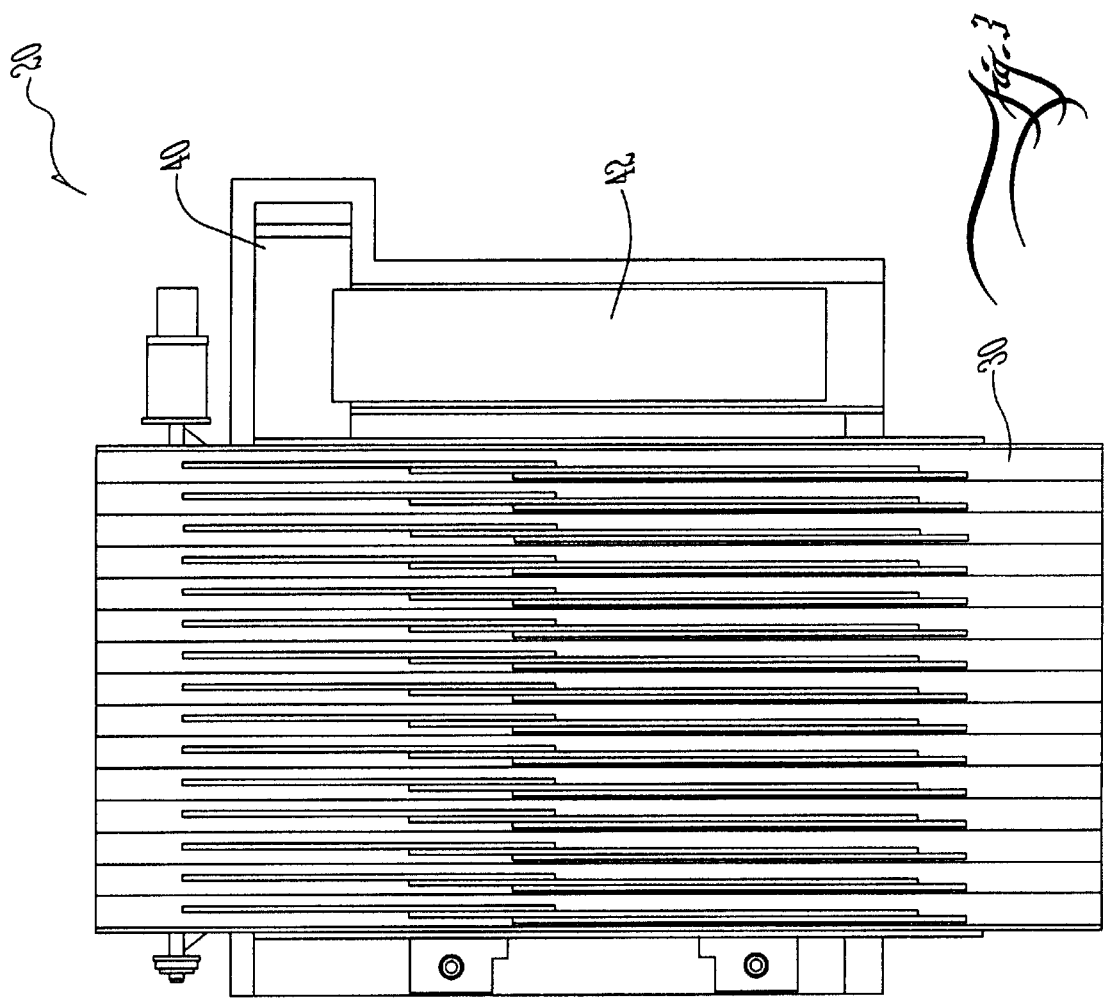

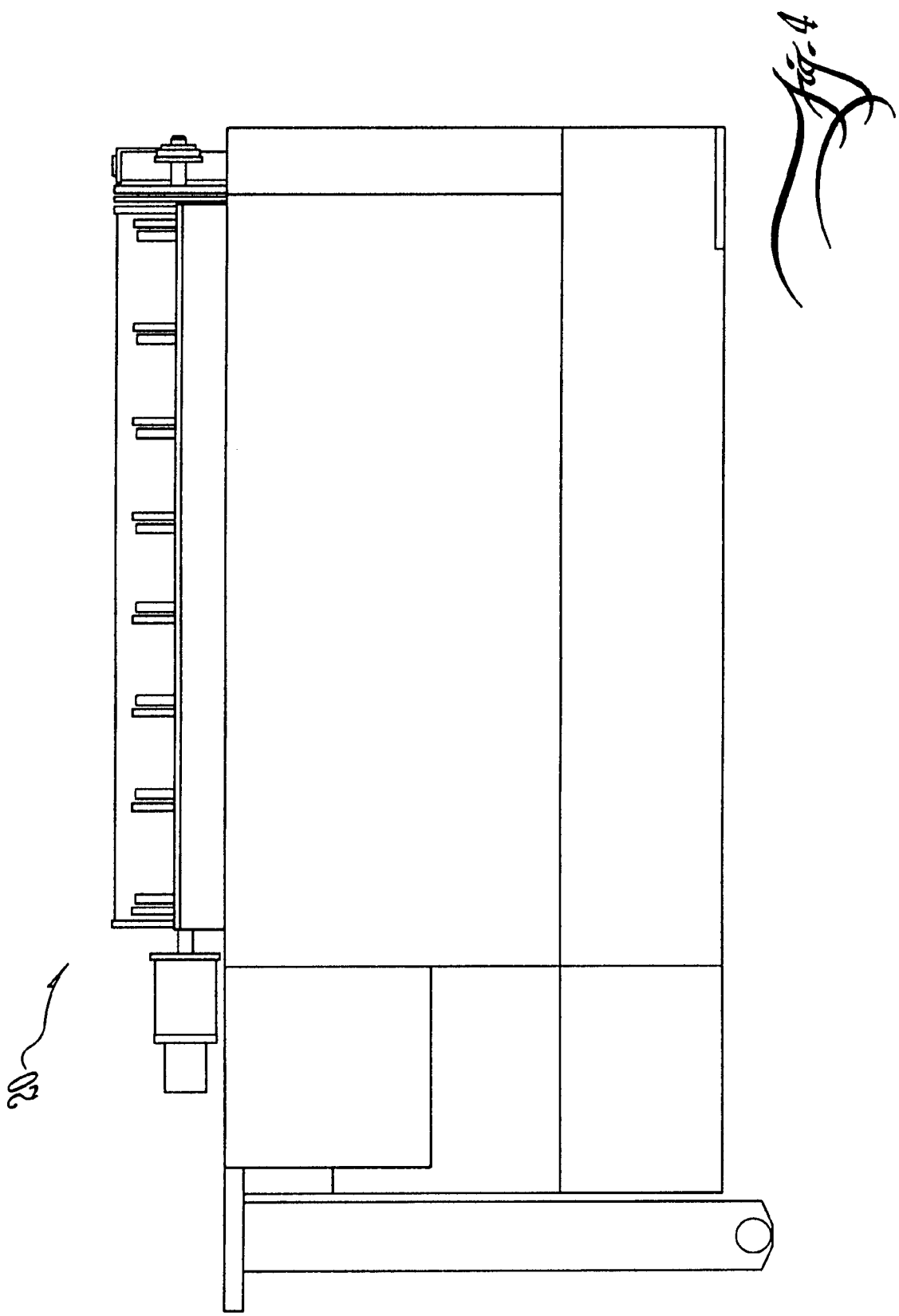

CONVERTIBLE COMBINATION BATTER MIXER AND APPLICATOR MACHINE

CROSS-REFERENCE TO PROVISIONAL APPLICATION(S)

This application claims the benefit of U.S. Provisional Application No. 60/176,877, filed Jan. 18, 2000.

BACKGROUND OF THE INVENTION

1. Field of the Invention

The invention generally relates to the batter coating of food products in food process lines and more particularly, to a machine which combines batter-mixing with batter-application in a single unit, as well as converts between handling tempura batter and regular batter. Further, for regular batter, it is preferred if the inventive machine further converts between operating in a re-circulating mode as well as operating in a batch mode. Additional aspects and objects of the invention will be apparent in connection with the discussion further below of preferred embodiments and examples.

2. Prior Art

In the field of large scale food processing, one of the problem areas has persistently been the preparation of Tempura style batter. Tempura style batter is used to coat certain food products before deep fat frying. Such food products range the spectrum from seafood pieces, onion and other vegetable pieces, poultry parts and so on.

Tempura style batter, or "tempura," are the names used in the food preparation trade to describe a thick leavened batter that swells in volume during frying. The dry mix formulation of tempura is typically available in fifty pound paper bags. For convenience, this seems to fix the standard measures of batch size for the dry mix as integral multiples of fifty pounds. Nowadays there are certain food processing lines in use which require the accurate mixing of 2,500 pounds per hour of tempura batter. If the batter is not accurately mixed, the final product will vary in appearance, weight and taste. The problem is further compounded because tempura is subject to some degradation after a span of time as little as a couple to a few minutes of mixing. The degradation becomes increasingly severe after several more minutes. Degradation occurs because the leavening reacts with water to form small gas bubbles. Prolonged agitation causes the gas bubbles to escape the tempura. Once the gas bubbles have escaped the tempura batter, the batter will not swell as desired during frying. An associated problem is if the tempura is allowed to stand for long periods of time before use, the gas will escape nevertheless despite very little agitation. This combination of required mixing accuracy, short mixing time and relatively short holding time means that tempura must be mixed quickly in relatively small quantities, and then be used up relatively quickly. It has long been the experience of the industry that tempura style batter simply requires much more watching over than regular mixing and application operations of regular batter.

What has developed is dedicated mixing machines which specialize in mixing either tempura batter or regular batter. More accurately, the tempura mixing machines are adapted for batch mixing. There are other machines used practically exclusively on regular batter, and these allow operation in continuous mode.

Since a food process line may alternate between instances of producing a tempuracoated product and other instances of not, the mixing machines are built on or as carts which allow wheeling into position for use and then away for non-use. A typical line may have the following stations in succession:—a pre-dusting station, a batter application station, a breading station, and then another batter application station.

The batter application machines are installed directly in the product flow path. The mixing machines which supply the batter to such applicators are carted up to positions in the aisle aside the batter machines. These mixing machines hence supply the applicator machines from the side, in the aisle. This presents various problems. The mixing machines occupy valuable floor space in what may be cramped quarters. The mixing machines are costly, and two machines for two different batter styles can be reckoned as costing twice as much as a single mixing machine. Also, in use, the mixing machines always work in tandem with an applicator machine. This too is a costly machine in addition to the costs of the two mixing machines.

What is needed is an improvement which overcomes the shortcomings of the prior art without detracting from any of the advantages thereof, as well as providing improvements or enhancements in areas not even addressed by the prior art.

Additional aspects and objects of the invention will be apparent in connection with the discussion further below of preferred embodiments and examples.

SUMMARY OF THE INVENTION

It is an object of the invention to provide a convertible, combination batter-mixer and -applicator machine that combines mixing and applying functions in one machine as well as affords conversion among at least three modes of use.

It is an alternate object of the invention that the above first mode involves the batter being preferably handled by mixing up one batch at a time from materials whose input quantities are specified in terms of defined weight-ratios, and then the batch is used up completely until depleted.

It is another object of the invention that a second mode preferably has the batter handled by mixing up one batch at a time from materials whose input quantities are adjusted in order to meet a defined-viscosity, and then the batch is used up completely until depleted.

It is an additional object of the invention that a third mode involve re-circulating the batter stock, which entail continuous re-stocking of the batter stock by mixing in the input materials at varying intervals to the existing stock and in input quantities that are adjusted in order to meet the defined-viscosity.

It is a further object of the invention the above machine get by on a single pump.

It is still another object of the invention the above machine get be surrounded by a refrigerated jacket.

These and other aspects and objects are provided according to the invention in convertible, combination batter-mixer and -applicator machine for continuous food process lines which operatively converts between a batch mode and a re-circulating mode. Such machine comprises the following.

It has a main batter pool for containing batter to a given fill level. The main batter pool is formed by a bottom wall extending between spaced sidewalls and spaced end walls of which one is an intake end and the other a discharge end. Disposed under the intake end of the main batter pool is a mixing tank such that an opening in the main batter pool's bottom wall at the intake end empties into the mixing tank. A conveyor belt is disposed in the main batter pool or at least partly sunk below the given fill level. The conveyor has an upper food-carrying run providing transit of food product between said intake and discharge ends and a lower batter-motivating run traversing the main batter pool's bottom wall for motivating batter in direction of the bottom wall's opening at the intake end.

Said batter machine further has a pump that outputs batter drawn out the mixing tank into the main batter pool. Another aspect of the batter machine is a removable flap to shut the opening in the intake end of the main pool's bottom wall. It thereby can generally block batter from emptying through that opening.

Accordingly, the absence of the removable flap allows operation in a re-circulation mode such that batter pumped into the main batter pool from the mixing tank circulates back thereto by the conveyor belt's lower run motivating batter to empty therein through the opening in the main batter pool's bottom wall at the intake end. And, the use of the removable flap allows operation in a batch mode such that a batch of batter pumped into the main batter pool from the mixing tank remains there for substantial depletion without recharge, wherein depletion occurs because batter is being perpetually carried away as coating on food product that is discharged by the conveyor.

Preferably the mixing tank is provided with a controller, a mixing element, a controllable feed service of water, another controllable feed service of dry mix, and HI/LO sensing in order to make up for batter that is carried off as coating on food product discharged by the conveyor. The mixing element might be any one of a revolving paddle, ribbons, wire whips or beaters.

The controller, the controllable feed service of water, and the controllable feed service of dry mix are operative to mix in water and dry mix based on weight ratios. Alternatively, the invention might include a viscometer in the mixing tank that provides signals to the controller such that controller, the controllable feed service of water, and the controllable feed service of dry mix are operative to mix in water and dry mix in adjustable ratios in order to meet a defined viscosity.

An inventive aspect of this machine relates to a viscometer that comprises the following. That is, the viscometer has a plenum provided with HI and LO sensors, and then the pump's output line is configured with a branch to fill the plenum and is also provided with a controllable valve such that the controller is operative to fill the plenum above the HI sensor. After having done so, the controller then counts the lapse of time as the level of batter in the plenum falls between the HI and LO sensors, wherein defined viscosities correspond to the passage of such time.

Preferably either the main batter pool, the mixing tank or a combination thereof is provided with HI/LO sensing for operating the pump and thereby controlling the fill level in the main batter pool in accordance with the given fill level. This HI/LO sensing and controlling is preferably operative in the batch mode to cycle in batches of batter one at a time into the main batter pool until a preceding batch is practically depleted before cycling in a succeeding batch. Alternatively, this HI/LO sensing and controlling is operative in the re-circulating mode to hold the batter level in the main batter pool at a relatively more constant level.

The inventive convertible, combination batter-mixer and -applicator machine might further include a submerger system disposed directly above the conveyor belt's food-carrying run in order to submerge food product below the batter level in the main batter pool during transit through the main batter pool. Optionally the main batter pool and the mixing tank might mate in a T-intersection such that the mixing tank forms the stem of the T-shape. Some form of a drive system provides the drive input for the conveyor. A further inventive aspect of this convertible, combination batter-mixer and -applicator machine relates to a refrigerant jacket surrounding portions of the mixing tank and main batter pool.

Additional aspects and objects of the invention will be apparent in connection with the discussion further below of preferred embodiments and examples.

BRIEF DESCRIPTION OF THE DRAWINGS

There are shown in the drawings certain exemplary embodiments of the screens for software in accordance with the invention as presently preferred. It should be understood that the invention is not limited to the embodiments disclosed as examples, and is capable of variation within the scope of the skills of a person having ordinary skill in the art to which the invention pertains. In the drawings, FIG. 1 is a perspective view of a convertible, combination batter-mixer and -applicator machine in accordance with the invention, wherein the product intake end is in the foreground in the view;

FIG. 2a is an side elevation view thereof, wherein the intake end is on the left side of the view;

FIG. 2b is an exploded view of FIG. 2a;

FIG. 3 is a top plan view thereof, wherein the intake end is at the top of the view;

FIG. 4 is an end elevational view of the product discharge end thereof and,

DETAILED DESCRIPTION OF THE PREFERRED EMBODIMENTS

Figure 5:
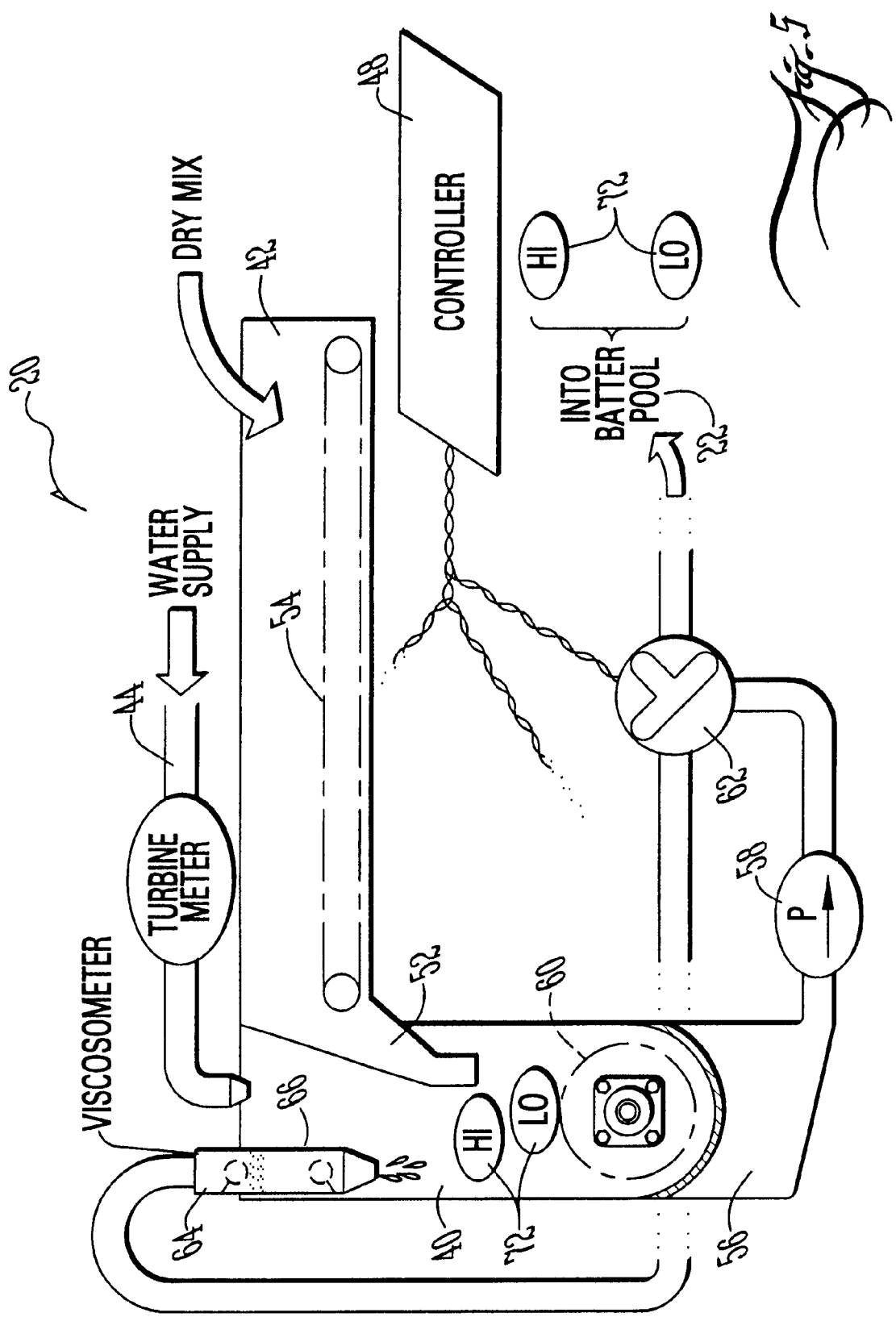
FIG. 5 is a partial piping and circuit schematic, in side elevation as comparable to FIGS. 2a or 2b, showing aspects of the mixing tank, the dry mix hopper, the water supply thereto.

The drawings show a convertible, combination batter-mixer and -applicator machine 20 in accordance with the invention. The inventive machine not only combines batter mixing with batter application in a single unit, but also converts between a preferred mode of handling tempura batter as well as various other (eg., at least two) modes more pertinent to regular batter.

Briefly stated, tempura batter is preferably handled by mixing up one batch at a time from materials whose input quantities are specified in terms of defined weight-ratios, and then used by using the batch up completely through depletion. Regular batter might be handled by alternative modes. By one of the alternatives, the batter is preferably handled by mixing up one batch at a time from materials whose input quantities are adjusted in order to meet a defined-viscosity, and then the batch is used up completely until depleted. The other of the alternative modes involves re-circulating the batter stock and calls for continuous boosting of the batter stock by mixing in the input materials at varying intervals to the existing stock and in input quantities that are adjusted in order to meet the defined-viscosity.

The machine includes a stand that supports a batter tank or pool 22. The batter tank is open topped and relatively shallow. In FIGS. 2a and 2b, the product intake or infeed end 24 is to the left. As seen in this profile of the machine's side, the batter tank has generally a trough shape. The batter tank has an entrant section getting gradually deeper to the main depth, and an exit section getting gradually shallower. The stand has a pair of jacks 26, both on one outboard side of the tank, for lifting and lowering a submerger conveyor 28 as well as, at times, a product conveyor 30.

The conveyors can be driven by their own motors. The conveyors preferably can be endless wire mesh belts. The product conveyor is driven at its infeed or intake end, and passes over a nose bar or small-diameter pulley equivalent at its discharge end to accomplish a gentle transfer of product. Both the product and submerger conveyors are looped around polyethylene wear bars (eg., 32) or the like, which give the belts their typical side profile.

The jacks provide direct lifting up and lowering down of the submerger conveyor. The jacks are mechanical and powered by electric motors. This is an ergonomic advantage that spares workers from the task of manually lifting anything. The product conveyor is hung from the submerger conveyor by a set of drive rods 34. The drive rods may be threaded and couple into internally threaded holes for them in the side rails or perhaps the outermost of the wear bars 32 of the product conveyor. Motorized turning of the drive rods can cause the product conveyor to be pulled up into a close nesting position directly under the submerger conveyor.

FIG. 2b shows the submerger conveyor in its full UP position. The product conveyor is shown supported at the full extended length of its drive rods. The set of drive rods (preferably four) can be driven in unison to crank up the product conveyor in a close nesting relationship under the submerger conveyor. FIG. 2a shows the product conveyor in its USE position in the batter tank. The jacks are operated until the submerger conveyor is set at the desired clearance above of the product conveyor's carrying run in order to accommodate the given food product in flow at the time (eg., thin clearance for thin meat strips or patties versus a wider clearance for whole-bone drumsticks and chicken parts). Although not shown by either FIGS. 2a or 2b, the product conveyor can be un-coupled from the submerger conveyor by the drive rods thereof, so that as the submerger conveyor is lifted UP the product conveyor remains at rest in the batter tank. All these options provide greater convenience for cleaning and maintenance operations.

In use, the endless open-mesh wire-conveyor belt defines an upper product carrying run for dipping product into the pool 22 filled with batter. The food product is kept submerged for a sufficient interval, and then climbs or rises from the pool and discharges over the nose bar or pulley equivalent to downline apparatus, which might be a breading station or perhaps a deep fat fryer (neither shown). The submerger conveyor belt has a lower run of the same type of wire mesh which closely follows the carrying run of the product belt, to force food product below the surface of the pool.

The inventive machine combines the aforementioned batter application capabilities with batter mixing capabilities as well. As shown by FIG. 5, the inventive machine includes a batter mixing tank 40, a dry-mix hopper 42, and a supply-line of water 44.

A controller 48 provides programmable logic control for many of the operations of the inventive machine. Some operations require manual work. The dry-mix hopper is preferably attended to and loaded by hand. That is, a worker empties into the dry-mix hopper the dry batter mix. The dry-mix hopper is an open-top trough, blinded (eg., shut or closed) at one end and emptying into a chute 52 at the other, and preferably provided with a cover. The bottom of the hopper 42 has an endless wire mesh conveyor 54 which when operated conveys the load of dry mix into the chute 52, which empties into the mixing tank 40. The hopper is elongated and extends along the outboard side of the batter pool on the side opposite the submerger jacks.

The mixing tank 40 is a relatively deeper trough, also elongated but extending transversely under the batter pool 22 near the product intake end thereof. The mixing tank is blinded at the end that the dry mix hopper discharges into. The mixing tank's opposite end terminates in a sump 56 connected to a suction side of the only batter pump 58 of the machine. The mixing tank has a half-round bottom wall which closely surrounds the lower-half of an auger-like mixing paddle 60. Mixing is accomplished by the revolving of the paddle. Among other structures to accomplish mixing include ribbons or wire whips or beater-cages and so on.

The pump discharge flows into a three-way valve 62 controlled by the controller, having positions of ON to the viscosometer (ie., shown in the drawing), ON to the batter pool, or else OFF. The viscosometer 64 operates on the following principle. It has a plenum 66 installed with a high float and a low float. The plenum is filled with batter drawn out from the sump and pumped into the plenum until both the high and low floats are floated. Then the pump is shut OFF. The batter is allowed to drain out the plenum. The viscosometer is calibrated such that a given value might be the desired reading to achieve. For example, the viscosometer might be sized such that the ideal viscosity drains out at a rate where the difference in time between the toggling of the high float and low float is ten (10) seconds. If the viscosometer signals the controller that the time interval was twelve (12) seconds, then the batter is too thick. It needs diluting or thinning, which is achieved by adding water. Eight (8) seconds is too thin, and the batter needs more dry mix. The drawing shows the batter level in the plenum about midway between the high and low float. If the batter measures in an acceptable range, it needs no more adjustment.

In use, the inventive machine preferably affords users at least three modes of operation or use as follows. In a first mode, the batter is preferably handled by mixing up one batch at a time from materials whose input quantities are specified in terms of defined weight-ratios, and then the batch is used up completely until depleted. The foregoing is preferred for tempura-style batter. In a second mode, the batter is preferably handled by mixing up one batch at a time from materials whose input quantities are adjusted in order to meet a defined-viscosity, and then the batch is used up completely until depleted. The third mode involves re-circulating the batter stock and calls for continuous re-stocking of batter by mixing in the input materials at varying intervals to the existing stock and in input quantities that are adjusted in order to meet the defined-viscosity.

In order, the mode of tempura style of batter has the following characteristics. The amount of water added with tempura dry mix is set at a given ratio, which almost universally is about 1:1 on a weight basis. Hence the hopper might be pre-filled with two bags of fifty pounds of tempura dry mix. The hopper conveyor empties all of that down the chute into the mixing tank. The same weight of water (eg., one hundred pounds) is added into the mixing tank. Mixing begins in accordance with a selected mixing profile, which preferably is pre-programmed into the controller. An example profile might mix originally at a rapid speed, and then taper down to a slower speed. There are many programming options to persons having ordinary skill in the art who would know best how to take advantage of the options. At the completion of the mixing cycle, the tempura style batter is ready for pumping into the batter pool 22 and application to product. The batter pool has HI and LO sensors 72. These signal the controller of conditions which the controller interprets for when it is time to prepare another batch. Since the batter in the main pool is being constantly depleted (eg., constantly being drawn out as a coating on discharging product), the depleting batter pool requires make up. The mixing tank likewise has HI and LO sensors 72 signaling the controllers of conditions in the mixing tank which the controller likewise enters into its calculus on when to initiate the succeeding batch for the depleting pool of batter in the main batter tank. Even though tempura style batter is mixed in discrete batches, the process of keeping the main batter pool supplied involves a series of discrete batch events in succession. The process does require the attention of a worker, who keeps the dry mix hopper supplied. Again, the worker empties in complete bags, and then logs the number of bags emptied into the hopper with the controller. One bag, two bags, three, four, etc., the work is relied on to supply the controller with the information. In other instances, the controller may display a request to the worker for just one bag, not more. The worker preferably affirms the action once completed.

Tempura style aside for the while, the invention provides at least two other modes of operation. There are preferably for use with regular batter. One is a batch mode and the other a re-circulating mode, and which for both modes the input quantities of dry mix are adjustably controlled in order to meet a defined viscosity. FIG. 2a shows that the return run of the product conveyor scrapes along the bottom of the batter tank and traverses over the open top of the mixing tank. There is a removable cover 74 which can be installed over the mixing tank's open top. In the batch mode, it is preferred if the mixing tank is covered (this is also true for the batch mode of using tempura style batter). In the re-circulating mode, the cover is removed. The return run of the product conveyor works like a pump equivalent, re-circulating some portion of the batter in the pool back into the mixing tank. As previously noted, the inventive machine merely has just a single batter pump. In contrast, the prior art machines have typically featured two or more pumps.

It is the cover which makes this inventive machine convertible between the distinct modes of operation, as will appear more clearly and particularly further below.

Accordingly it is an inventive aspect of this convertible, combination batter mixer and applicator machine in accordance with the invention, to provide a re-circulating mode of operation, continuously circulating batter back and forth between the mixing tank and batter pool, and do so getting by with a single pump only.

Briefly stated, the work of a second pump which the prior art devices to date have needed, is performed equivalently by the return run of the product conveyor 30. An inventive aspect of this machine 20 is the arrangement of the mixing tank 40 relative to the main batter pool 22 in order to get the return run of the product conveyor 30 to return batter stock to the mixing tank 40. This inventive arrangement has the mixing tank 40 placed below the intake end of the main batter pool 22 as shown, such that the bottom of the main batter pool 22 at the intake end vanishes and becomes the open top of the mixing tank 40.

Between the two available modes for regular batter, the batch mode involves the following characteristics. A worker loads the dry mix into the hopper. At the time selected by the controller, the hopper is emptied into the mixing tank. Water is added on a basis selected by the worker with the controller. However, the controller has the opportunity to test for viscosity of the mixing batter. Viscosity testing is simply not utilized with tempura style batter. In the case of tempura style batter, the input materials are simply mixed in at defined weight ratios and that's that. The mixing ratios for regular batter are not so woodenly defined. In fact, regular batter as a classification encompasses a lot of diversity in batter. Whereas the ideal mixing ratio may indeed be defined by the producer of the dry mix, in actual use environments there are a lot of factors present that make it difficult to prescribe a given ratio for every situation.

Generally, workers in the field know more exactly what viscosity they want rather than blindly follow recommended mixing ratios. Given a bunch of variable factors, often times the recommended mixing ratios might not apply too well. Hence, the invention includes an inventive automatic viscosometer. The inventive viscosometer provides the reading which the controller can interpret to base a decision whether to add more water and hence dilute or thin the batter or alternatively add more dry mix and hence thicken it. Therefore, in use, the recommended batch starting amounts are added into the mixing tank and mixed. After so much mixing, the batter is tested by the viscosometer. If the test amount gives an acceptable measure, the batter is qualified for re-supplying the depleting batter pool in the main batter tank. If the test amount is not acceptable, then either water or dry mix is added, and the procedure is repeated until optimally an acceptable measure is converged upon.

The re-circulating mode differs. First recall about the batch mode that the whole batch in the mixing tank is used up until the level in the mixing tank falls below the LO level. And then, after so long a delay, a succeeding batch is mixed up. In the re-circulating mode, an original batch is mixed up to originally charge the mixing tank and main batter pool. After that, mixing is done on a basis other than complete utilization of discrete batches at a time.

In the re-circulating mode, and unlike the previously described batch modes, the batter in the main batter pool is constantly re-circulating back in and hence mixing with the batter residing in the mixing tank. Thus there is commingling between the batter in the batter pool and the batter in the mixing tank. That is not preferred in the batch modes. In the batch modes, preferably the batter in the mixing tank is given a one-way trip into the main batter pool, never to return. This is achieved in part by covering the open top of the mixing tank with a plate 74 that the return run of the product conveyor scrapes across. The re-circulating mode favors circulation. Hence the convertible plate is removed. Some fraction of the batter in the main pool is free to spillover into the mixing tank.

The inventive viscosometer provides special advantages for the re-circulating mode by virtue of allowing monitoring of the batter's viscosity. In the re-circulating mode, the batter viscosity is subject to excursions for a variety of reasons. Usually, just immediately upline of the batter station is either a pre-dust station or breading station. That is, the product is received already coated in a finely divided solid, typically flour or breading, likely some spices too. To this, the batter station gives the coated product an overcoat of batter. Yet in the batter pool, the coated product likely sheds some of its coating. The coating, once dropped off in the circulating batter in the batter machine, tends to thicken the batter.

The shedding flour or breading is not so much a problem with the batch mode because, briefly stated, the batter pool is practically depleted from one batch to the next. Hence there is much less problem of gradual accumulation of flour or breading in the batter than as experienced with the re-circulating mode. Yet the re-circulating mode is generally desirable because, batter viscosity changes aside, it is a more highly automated mode of operation. The re-circulating mode generally requires a lot less worker attention or watching over than batch modes. Yet the re-circulating mode can find itself beset with problems of long-term accumulation of flour or breading from upline processes, which have consequences in the batter station. Namely, the consequences are the thickening of the batter. The batter might sometimes change to being too thin because the incoming product is bringing in a lot of moisture. But this is not as commonly encountered as batter thickening.

Hence the solution in accordance with the invention has been to provide the inventive viscosometer in the control system. The controller is programmed to undertake, after some given period of time, a viscosity measurement, and make adjustments (or not) dependent on the taken measurements. Concurrently, the controller is being signaled by the HI and LO sensors of both the main batter pool and the mixing tank. Given these signals, the controller causes mixing and supply of batter from the mixing tank to the depleting batter pool. Preliminary, the controller operates under some basic guidelines relating how much water to add to meet how much dry mix is added by duration of operation of the hopper conveyor. But since the dry measure of the dry mix is only moderately accurate this way, then it is preferred if the final consistency of the batter is determined by the viscosity measurement.

Another advantage of the having the mixing tank and main batter pool so close together is the following. It is preferred if the batter is kept chilled in about the 40° F. to 50° F. range. In order to accomplish this, at least the walls of the mixing tank as well as the bottom of the main batter tank are jacketed (to the extent possible in the cramped quarters) with a coolant jacket. The preferred refrigerant includes FREON, glycol and/or ammonia or the like. Preferably the refrigerant equipment servicing the refrigerant cycle is custom mounted onboard the stand of the inventive machine, and the controls of the refrigerant equipment are given over to the controller. To compare the prior art, typically a given mixing machine sits in an aisle to service, say two applicator machines. Remember, a typical food process line might have the following stations in series:—1) pre-dust, 2) batter, 3) bread, 4) batter, 5) fry and freeze and package and so on. Hence there are two batter stations, and that takes two batter application machines. In the prior art way of doing things, a single mixer was rigged to dually service the two applicators. Doing it that way saved money:—one mixing machine cost less than two. Yet the single mixing machine would require first and second lines of flexible conduit for piping batter back and forth from the first applicator, and then third and fourth lines of flexible conduit for piping batter back and forth to the second applicator. All this flexible conduit laying on the ground causes the batter to warm up to room temperature, and defies all reasonable efforts to keep the batter cool.

The batter quality degrades if allowed to warm up. The compromise is not the worthiness of the food product as consumable food, but rather a compromise in the optimum flavor available from the choice spices and ingredients. Hence the above-described prior art way serves up food product with less than optimum flavor. The invention overcomes this shortcoming.

One way to achieve improved cooling performance is the following. The actual walls and bottom of the main batter tank and the walls of the mixing tank are the actual sides and bottoms of the respective tanks. That is, the walls and/or bottom are single ply, preferably stainless. The cooling jacket is applied directly to the single ply stainless. The cooling jacket is dimpled in places to split the refrigerant pathway into interweaving tendrils to promote more efficient drawing down of the temperature. The coolant jacket at least is applied directly to the bottom of the main tank. Since the side walls are relatively short and do not present much surface area, they may be left un-jacketed.

Given the foregoing, the convertible, combination batter mixer and applicator machine in accordance with the invention replaces what has typically been done by three machines in accordance with the prior art. That is, the prior art way of doing things typically involves a separate applicator service at alternatively different times by either a tempura/batch mixer or else a continuous mode mixer for handling regular style batter. The convertible, combination batter mixer and applicator machine obviates the prior art way of doing things in favor of a more economical solution, in a more compact package, with features, enhancements and/or improvements not known in the prior art.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A combination batter-mixer and -applicator machine for continuous food process lines, comprising:

a main batter pool for containing batter to a given fill level and having a bottom wall between spaced sidewalls and spaced end walls of which one is an intake end and the other a discharge end;

a mixing tank disposed under the intake end of the main batter pool such that an opening in the main batter pool's bottom wall at the intake end empties into the mixing tank;

a conveyor belt being disposed in the main batter pool at least partly sunk below the given fill level and having an upper food-carrying run providing transit of food product between said intake and discharge ends and a lower batter-motivating run traversing the main batter pool's bottom wall for motivating batter in direction of the bottom wall's opening at the intake end; and a circulating pump that outputs batter drawn out the mixing tank into the main batter pool to form re-circulation of batter such that the conveyor belt's lower batter-motivating run motivates the return of batter to the mixing tank by emptying through the opening in the main batter pool's bottom wall at the intake end.

2. The combination batter-mixer and -applicator machine of claim 1 wherein the mixing tank is provided with a controller, a mixing element, a controllable feed service of water, another controllable feed service of dry mix, and HI/LO sensing in order to make up for batter that is carried off as coating on food product discharged by the conveyor.

3. The combination batter-mixer and -applicator machine of claim 2 wherein the mixing element comprises one of a revolving paddle, ribbons, wire whips or beaters.

4. The combination batter-mixer and -applicator machine of claim 2 wherein the controller, the controllable feed service of water, and the controllable feed service of dry mix are operative to mix in water and dry mix based on weight ratios.

5. The combination batter-mixer and -applicator machine of claim 2 further comprising a viscometer in the mixing tank that provides signals to the controller such that controller, the controllable feed service of water, and the controllable feed service of dry mix are operative to mix in water and dry mix in adjustable ratios in order to meet a defined viscosity.

6. The combination batter-mixer and -applicator machine of claim 5 wherein the viscometer comprises a plenum provided with HI and LO sensors, the pump's output line is configured with a branch to fill the plenum and provided with a controllable valve such that the controller is operative to fill the plenum above the HI sensor and then counts the lapse of time as the level of batter in the plenum falls between the HI and LO sensors, wherein defined viscosities correspond to the passage of such time.

7. The combination batter-mixer and -applicator machine of claim 1 wherein either the main batter pool, the mixing tank or a combination thereof is provided with HI/LO sensing for operating the pump and thereby controlling the output into the main batter pool in accordance with the given fill level.

8. The combination batter-mixer and -applicator machine of claim 1 further comprising a submerger system disposed directly above the conveyor belt's food-carrying run in order to submerge food product below the batter level in the main batter pool during transit therethrough.

9. The combination batter-mixer and -applicator machine of claim 1 wherein the main batter pool and the mixing tank mate in a T-intersection such that the mixing tank forms the stem of the T-shape.

10. The combination batter-mixer and -applicator machine of claim 1 further comprising a refrigerant jacket surrounding portions of the mixing tank and main batter pool.

11. A convertible, combination batter-mixer and -applicator machine for continuous food process lines which operatively converts between a batch mode and a re-circulating mode, comprising:

a main batter pool for containing batter to a given fill level and having a bottom wall between spaced sidewalls and spaced end walls of which one is an intake end and the other a discharge end;

a mixing tank disposed under the intake end of the main batter pool such that an opening in the main batter pool's bottom wall at the intake end empties into the mixing tank;

a conveyor belt being disposed in the main batter pool at least partly sunk below the given fill level and having an upper food-carrying run providing transit of food product between said intake and discharge ends and a lower batter-motivating run traversing the main batter pool's bottom wall for motivating batter in direction of the bottom wall's opening at the intake end;

a pump that outputs batter drawn out the mixing tank into the main batter pool; and, a removable blocker to block the opening in the intake end of the main pool's bottom wall and thereby generally block batter from emptying therethrough;

wherein the absence of the removable blocker allows operation in a re-circulation mode such that the batter pumped into the main batter pool from the mixing tank circulates back thereto by the conveyor belt's lower run motivating batter to empty therein through the opening in the main batter pool's bottom wall at the intake end; and wherein the use of the removable blocker allows operation in a batch mode such that a batch of batter pumped into the main batter pool from the mixing tank remains there for substantial depletion without recharge, which depletion is achieved by being carried away as coating on food product that is discharged by the conveyor.

12. The combination batter-mixer and -applicator machine of claim 11 wherein the mixing tank is provided with a controller, a mixing element, a controllable feed service of water, another controllable feed service of dry mix, and HI/LO sensing in order to make up for batter that is carried off as coating on food product discharged by the conveyor.

13. The combination batter-mixer and -applicator machine of claim 12 wherein the controller, the controllable feed service of water, and the controllable feed service of dry mix are operative to mix in water and dry mix based on weight ratios.

14. The combination batter-mixer and -applicator machine of claim 12 further comprising a viscometer in the mixing tank that provides signals to the controller such that controller, the controllable feed service of water, and the controllable feed service of dry mix are operative to mix in water and dry mix in adjustable ratios in order to meet a defined viscosity.

15. The combination batter-mixer and -applicator machine of claim 4 wherein the viscometer comprises a plenum provided with HI and LO sensors, the pump's output line is configured with a branch to fill the plenum and provided with a controllable valve such that the controller is operative to fill the plenum above the HI sensor and then counts the lapse of time as the level of batter in the plenum falls between the HI and LO sensors, wherein defined viscosities correspond to the passage of such time.

16. The combination batter-mixer and -applicator machine of claim 11 wherein either the main batter pool, the mixing tank or a combination thereof is provided with HI/LO sensing for operating the pump and thereby controlling the batter level in the main batter pool in accordance with the given fill level.

17. The combination batter-mixer and -applicator machine of claim 16 wherein HI/LO sensing and controlling is operative in the batch mode to cycle in batches of batter in the main batter pool one at a time until a preceding batch is practically depleted before cycling in a succeeding batch, or else in the re-circulating mode to hold the batter level in the main batter pool at a relatively more constant level.

18. The combination batter-mixer and -applicator machine of claim 11 further comprising a submerger system disposed directly above the conveyor belt's food-carrying run in order to submerge food product below the batter level in the main batter pool during transit therethrough.

19. The combination batter-mixer and -applicator machine of claim 11 wherein the main batter pool and the mixing tank mate in a T-intersection such that the mixing tank forms the stem of the T-shape.

20. The combination batter-mixer and -applicator machine of claim 11 further comprising a drive system for driving the conveyor.

* * * * *